(12) United States Patent
DePoorter et al.

(10) Patent No.: US 6,296,886 B1
(45) Date of Patent: Oct. 2, 2001

(54) METHOD OF FILM CREASE ELIMINATION AND PATCH BAG WITHOUT CREASE WITHIN LAY-FLAT BAG SIDE

(75) Inventors: Larry W. DePoorter, Wichita Falls, TX (US); Donald B. Moore, Jr., Moore, SC (US); Robert A. Odabashian, Greer, SC (US); Joseph M. Ramirez, Greenville, SC (US); Carl L. Tucker, Duncan, SC (US); Richard M. Worley, Spartanburg, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/819,841

(22) Filed: Mar. 17, 1997

(51) Int. Cl.$^7$ .................................................... B31B 1/90

(52) U.S. Cl. ........................ 426/127; 426/129; 383/109; 383/119; 493/210

(58) Field of Search ................................. 426/127, 129; 156/277, 272.6, 302, 297, 229; 206/204; 383/119, 109; 493/210

(56) References Cited

U.S. PATENT DOCUMENTS

| | | | |
|---|---|---|---|
| 3,383,746 | 5/1968 | Narduzzi et al. | 29/33.5 |
| 3,454,441 | 7/1969 | Spruyt | 156/244 |
| 3,552,090 | 1/1971 | Roberts et al. | 53/71 |
| 3,628,576 | 12/1971 | Owen | 141/65 |
| 3,741,253 * | 6/1973 | Brax et al. | 138/137 |
| 4,064,296 | 12/1977 | Bornstein et al. | 428/35 |
| 4,105,491 * | 8/1978 | Haase et al. | 156/553 |
| 4,119,267 | 10/1978 | Kydonieus | 229/53 |
| 4,120,716 | 10/1978 | Bonet | 156/272 |
| 4,136,205 | 1/1979 | Quattlebaum | 426/412 |
| 4,239,111 | 12/1980 | Conant et al. | 206/484 |
| 4,254,173 * | 3/1981 | Peer, Jr. | 428/204 |
| 4,278,738 | 7/1981 | Brax et al. | 428/515 |
| 4,302,565 | 11/1981 | Goeke et al. | 526/88 |
| 4,302,566 | 11/1981 | Karol et al. | 526/125 |
| 4,534,984 | 8/1985 | Kuehne | 426/412 |
| 4,539,236 | 9/1985 | Vilutis | 428/35 |
| 4,755,403 | 7/1988 | Ferguson | 428/35 |
| 4,879,430 | 11/1989 | Hoffman | 428/35.1 |
| 5,020,922 * | 6/1991 | Schirmer | 383/119 |
| 5,188,273 | 2/1993 | Schmoock | 226/190 |
| 5,206,075 | 4/1993 | Hodgson, Jr. | 428/216 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,302,402 | 4/1994 | Dudenhoeffer et al. | 426/129 |
| 5,310,329 | 5/1994 | Cree | 425/72.1 |
| 5,376,394 | 12/1994 | Dudenhoeffer et al. | 426/415 |
| 5,397,613 | 3/1995 | Georgelos | 428/36.7 |
| 5,401,344 | 3/1995 | Dickson et al. | 156/90 |
| 5,473,863 | 12/1995 | Itkonen | 53/465 |
| 5,477,572 | 12/1995 | Weingartner et al. | 5/459 |

(List continued on next page.)

FOREIGN PATENT DOCUMENTS

| | | |
|---|---|---|
| 0 621 205 A | 10/1994 | (EP) . |
| 654460 | 6/1951 | (GB) . |
| 2 057 392 | 4/1981 | (GB) . |
| 2 291 402 | 1/1996 | (GB) . |
| WO 90/03414 | 4/1990 | (WO) . |
| WO 93/03093 | 2/1993 | (WO) . |

Primary Examiner—Curtis E. Sherrer
(74) Attorney, Agent, or Firm—Rupert B. Hurley, Jr.

(57) ABSTRACT

A process for removing creases from a film eliminates a problem in the quality of the heat seal for a patch bag having at least a segment of one or more bag side edges (or the bag bottom edge) covered by one or more patches. The film creases are removed by inflating the film tubing which is later converted to a bag, heating regions containing the creases with a heating means to a temperature which, in combination with the pressure within the inflated tubing, causes the creases to relax. The heated crease-containing regions are then cooled and the inflated tubing is deflated and wound up in a new configuration in which at least one patch covers at least one side edge or the bottom edge.

16 Claims, 9 Drawing Sheets

U.S. PATENT DOCUMENTS

| | | | |
|---|---|---|---|
| 5,503,705 | * 4/1996 | Rohleder et al. | 156/494 |
| 5,534,276 | * 7/1996 | Ennis | 426/127 |
| 5,540,646 | 7/1996 | Williams et al. | 493/210 |
| 5,545,419 | 8/1996 | Brady et al. | 426/129 |
| 5,591,390 | 1/1997 | Walton et al. | 264/456 |
| 5,604,043 | * 2/1997 | Ahlgren | 428/518 |
| 5,660,868 | * 8/1997 | Yeager | 426/124 |
| 5,804,265 | * 9/1998 | Saad et al. | 428/35.2 |

* cited by examiner

METHOD OF FILM CREASE ELIMINATION AND PATCH BAG WITHOUT CREASE WITHIN LAY-FLAT BAG SIDE

FIELD OF THE INVENTION

The present invention relates to the packaging of bone-in meat products. More particularly, the present invention relates to a bag having a protective patch for reducing or eliminating puncture of the bag by a bone in a meat product packaged therein.

BACKGROUND OF THE INVENTION

Heat-shrinkable thermoplastics are known to be useful as flexible packaging materials for vacuum packaging various foodstuffs, including meat. Such plastic materials, however, while generally suitable for packaging meat, understandably have difficulties in successfully packaging sharp or bony products. For example, attempts to package bone-in primal cuts of meat usually result in an unsatisfactorily large number of bag failures due to bone punctures. The use of cushioning materials such as paper, paper laminates, wax impregnated cloth, and various types of plastic inserts have proved to be less than totally satisfactory in solving the problem. The preparation of special cuts of meat or close bone trim with removal of protruding bones has also been attempted. However, this is at best only a limited solution to the problem since it does not offer the positive protection necessary for a wide variety of commercial bone-in types of meat. Furthermore, removal of the bone is a relatively expensive and time-consuming procedure.

The use of heat-shrinkable bags having one or two heat-shrinkable patches adhered thereto has recently become a commercially-preferred manner of packaging a number of bone-in meat products. However, even the bags having two patches thereon leave "uncovered regions" (i.e., regions of the bag which are not covered by the patch, also herein referred to as "bald regions") which are more vulnerable to puncture because they do not have a patch adhered thereover.

Patch bags used in packaging bone-in meat products are generally provided in a "lay-flat" position, in which the factory seal or seals are in contact with a table surface on which the patch bag is placed during insertion of the meat product into the bag. However, it has been found that for certain cuts of meat, the uncovered regions along one or more edges of the bag are likely to be contacted with exposed bone at the periphery of the meat product which is being inserted into the bag. As a result, some packagers of such cuts have been "rotating" the bag about ninety degrees before inserting the bone-in meat product into the bag. In this manner, the uncovered region of the bag is positioned some distance away from the exposed bones along the periphery of the meat product.

In response to this problem, a patch bag which has come to be known as a "rotated patch bag" has been developed, in which the patches cover at least a portion of an edge of the bag, these bags having uncovered regions between the patches, these regions being positioned away from the bag edges. However, in the process of making such patch bags, it has been found that the creases (in the tubing from which the bag portion is made) interfere with the beat sealing. More particularly, some of the seals have a "line" therethrough. This line is believed to be associated with an imperfect seal which either leaks or is a particularly weak spot in the seal. It would be desirable to produce a patch bag having patches which cover one or more bag edges and which has seals which are not made across creases in the bag film.

SUMMARY OF THE INVENTION

The present invention provides a patch bag in which a patch covers a bag edge, with a seal which is not made across a crease in the bag film. The also provides a process for removing film creases in a film tubing before the sealing step which is carried out during the making of a patch bag in which a patch covers a bag edge. In this manner, the problem of the defective seal has been solved.

As a first aspect, the present invention is directed to a patch bag comprising a bag and a patch adhered thereto. The patch bag has an open top, a bottom edge, a first side edge, a second side edge, a first lay-flat side, and a second lay-flat side. The patch covers at least a segment of a member selected from the group consisting of the first side edge, the second side edge, and the bottom edge, and wherein the first lay-flat side does not have a crease therethrough and the second lay-flat side does not have a crease therethrough.

Preferably, the bag comprises a first heat-shrinkable film, and the patch comprises a second heat-shrinkable film. Preferably, first film has been biaxially-oriented, and the second film has been biaxially-oriented. The bag can be an end-seal bag or a side-seal bag.

Preferably, the patch is a first patch which covers a segment of the first side edge, with the patch bag further comprising a second patch which covers a segment of the second side edge, the second patch comprising a third biaxially-oriented, heat-shrinkable film. Preferably, both of the patches are adhered to the bag with an adhesive. Although the patches can be adhered to the inside surface of the bag the patches are adhered to an outside surface of the bag. Preferably, the bag has a first uncovered region which is between the first patch and the second patch and which is on the first lay-flat side of the bag, and a second uncovered region which is between the first patch and the second patch and which is on the second lay-flat side of the bag. Preferably, the first uncovered region has a width of from about 0.2 to 15 inches, and the second uncovered region has a width of from about 0.2 to 15 inches; preferably, from about 0.2 to 2 inches preferably, from about 0.5 to 10 inches; still more preferably, from about 1 to 8 inches.

Preferably, the first film comprises: (i) an outside abuse layer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer; (ii) an inner $O_2$-barrier layer comprising at least one member selected from the group consisting of ethylene/vinyl alcohol copolymer, polyvinyl chloride, polyvinylidene chloride, polyamide, polyester, polyacrylonitrile; and (iii) an inside sealant layer comprising at least one member selected from the group consisting of thermoplastic polyolefin, thermoplastic polyamide, thermoplastic polyester, and thermoplastic polyvinyl chloride.

Preferably, the second film and the third film each comprise at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer.

Preferably, the first film has a total thickness of from about 1.5 to 5 mils; more preferably, about 2.5 mils. Preferably, the first film has a total free shrink (i.e., L+T), at 185° F., of from about 20 to 120 percent; more preferably, 30 to 80 percent; still more preferably, about 50 percent.

Preferably, the second film has a total thickness of from about 2 to 8 mils; more preferably, from about 3 to 6 mils. Preferably, the second film has a total free shrink, at 180° F., of from about 10 to 100 percent; more preferably, from about 20 to 60 percent; still more preferably, about 30 percent.

Preferably, the third film has a total thickness of from about 2 to 8 mils; more preferably, from about 3 to 6 mils. Preferably, the third film has a total free shrink at 180° F., of from about 10 to 100 percent; more preferably, from about 20 to 60 percent; still more preferably, about 30 percent. Preferably, the third film has the same chemical composition, layer order, and layer thickness as the second film.

Alternatively, the patch bag of the present invention can be a side-seal bag, having a patch which covers at least a segment of the bottom edge of the bag. A preferred side-seal patch bag according to the present invention is otherwise in accordance with the preferred end-seal patch bag according to the present invention.

As a second aspect, the present invention is directed to a process for making a patch bag, comprising: (A) adhering a patch to a first lay-flat side of a film tubing while the tubing is in a first lay-flat configuration, whereby a tubing-patch laminate is formed, wherein the tubing having a first crease along a first side edge and a second crease along a second side edge; (B) passing the tubing-patch laminate through a first pair of nip rolls with the tubing being inflated by a trapped bubble of gas between the first pair of nip rolls and a second pair of upper nip rolls, whereby an inflated tubing-patch laminate is formed; (C) heating a first region of the tubing-patch laminate which contains a first crease, and a second region of the tubing-patch laminate which contains a second crease, the heating being carried out so that each of the creases relax; (D) cooling the first and second regions of the tubing-patch laminate; (E) deflating and flattening the rotated tubing-patch laminate into a second lay-flat configuration by passing the tubing-patch laminate through the second pair of nip rolls which have a nip which is oriented from about 10 to 90 degrees off-parallel relative to a nip of the first pair of nip rolls, so that the patch covers a segment of a first new side edge of the tubing; and (F) sealing and cutting the tubing so that a patch bag is formed from a segment of the tubing, the segment of the tubing having the patch adhered thereto.

Preferably, the second pair of nip rolls can be oriented from about 1 to 90 degrees off-parallel relative to the first pair of nip rolls; more preferably, from about 40 to 90 degrees off-parallel; still more preferably, from about 60 to 90 degrees off-parallel; and, yet still more preferably, from about 75 to 90 degrees off-parallel. Precisely about 90 degrees off-parallel is not preferred because this causes the heated areas to line up with one another, which has been found to be less advantageous during the subsequent sealing and cutting step.

Preferably, the first and second regions of the tubing-patch laminate are each heated to a temperature of from about 120 to 170° F. (more preferably, from about 140 to 170° F.), and the cooling of the first and second regions of the tubing-patch laminate cools the first and second regions to a temperature of from about 85 to 110° F. Preferably, the heating is carried out by at least one member selected from the group consisting of infrared radiation and hot air, and preferably cooling is carried out by blowing cool air against the heated regions of the film, the air having a temperature of from about 55 to 85° F.

Preferably, the trapped bubble in the tubing exerts a pressure of from about 1 to 18 inches of water on an inside surface of the tubing-patch composite. Preferably, the process is carried out by adhering a first patch is adhered to a first lay-flat side of the tubing, and adhering a second patch is adhered to a second lay-flat side of the tubing, and upon deflation and flattening into the second lay-flat configuration, the first patch covers a segment of the new first side edge and the second patch covers a segment of the new second side edge; and wherein the cutting and sealing are carried out so that an end-seal patch bag is produced. Preferably, the second pair of nip rolls is oriented from about 80 to 89 degrees off-parallel relative to the first pair of nip rolls.

Preferably, the process is carried out so that a preferred patch bag according to the present invention is produced.

As a third aspect, the present invention is directed to a packaged product comprising a patch bag according to the present invention, the patch bag surrounding a bone-in meat product. Preferably, the bone in meat product comprises at least one member selected from the group consisting of spareribs, back ribs, and short ribs; more particularly, pork spare ribs, beef back ribs, beef short ribs, and pork back ribs.

DETAILED DESCRIPTION OF THE INVENTION

Figure 1:
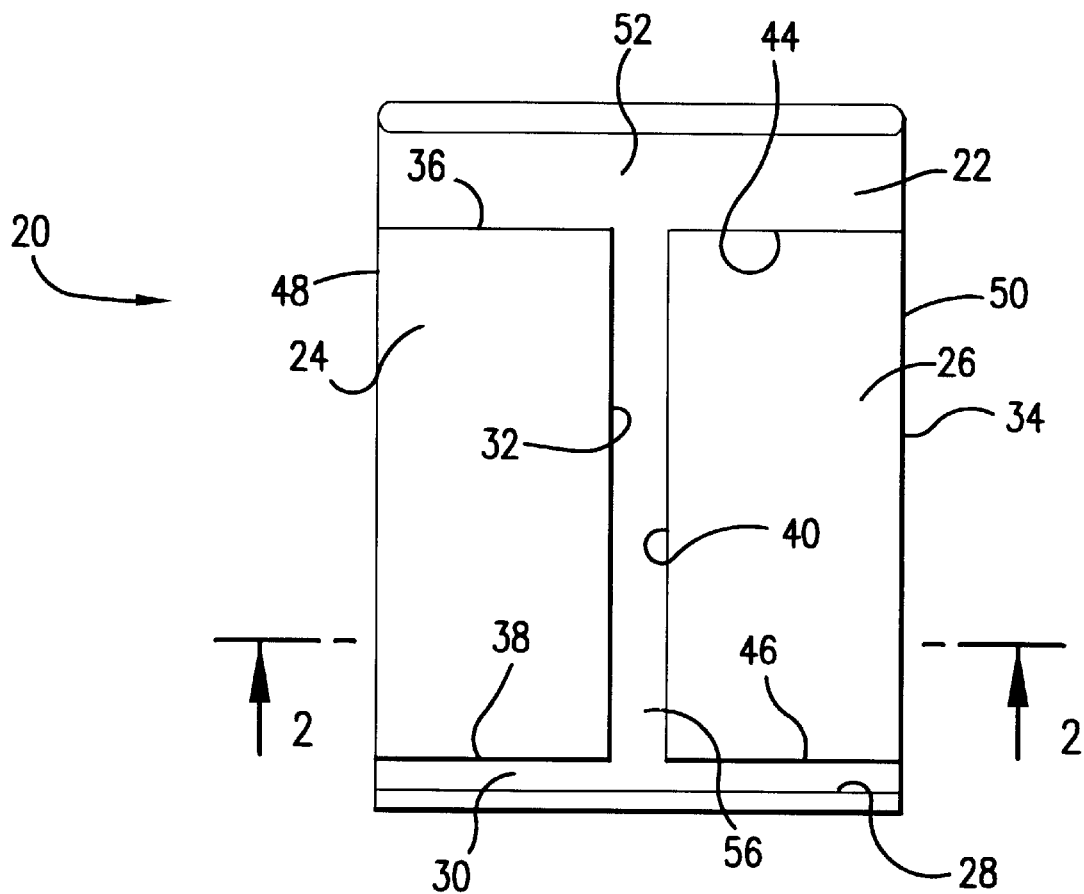
FIG. 1 illustrates a schematic view of a preferred end-seal patch bag according to the present invention, in a lay-flat view.

As used herein, the phrase "uncovered portion of the bag" refers to a portion of the bag which is not covered by a patch, i.e., a portion of the bag having both its inside surface and its outside surface not adhered to, or otherwise covered by, one or more patches.

As used herein, the phrase "patches substantially aligned when the patch bag is in the lay-flat position" refers to patch alignment, when the patch bag is in its lay-flat position, so that at least one edge of one of the patches is within 0.5 inches of a corresponding edge of the other patch; preferably, within 0.2 inch; more preferably, within 0.1 inch. Preferably, each of the patches have four sides, a preferably, each of the edges of each of the patches being substantially aligned with the corresponding edge of the other patch.

As used herein, the phrase "lay-flat film" refers to a film that has been extruded as a wide, thin-walled, circular tube, usually blown, cooled, then gathered by converging sets of rollers and wound up in flattened form. The phrase "lay-flat width", refers to half of the circumference of the inflated film tube.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of a film surface to a second region of a film surface, wherein the seal is formed by heating the regions to at least their respective seal initiation temperatures, i.e., a heat seal. The sealing can be performed by any one or more of a wide variety of manners, such as using a heated bar, hot air, hot wire, infrared radiation, ultrasonic sealing, radio frequency sealing, etc.

Heat sealing is the process of joining two or more thermoplastic films or sheets by heating areas in contact with each other to the temperature at which fusion occurs, usually aided by pressure. When the heat is applied by dies or rotating wheels maintained at a constant temperature, the process is called thermal sealing. In melt-bead sealing, a narrow strand of molten polymer is extruded along one surface, trailed by a wheel that presses the two surfaces together. In impulse sealing, heat is applied by resistance elements that are applied to the work when relatively cool, to rapidly heat the film and form a heat seal. Simultaneous sealing and cutting can be performed in this way. Dielectric sealing is accomplished with polar materials by inducing heat within the films by means of radio-frequency waves. When heating is performed with ultrasonic vibrations, the process is called ultrasonic sealing.

As used herein, the phrases "food-contact layer" and "meat-contact layer" refer to a layer of a multilayer film which is in direct contact with the food/meat in the package comprising the film. In a multilayer film, a food-contact layer is always an outer film layer, as the food-contact layer is in direct contact with the food product within the package. The food-contact layer is an inside layer in the sense that with respect to the packaged food product, the food-contact layer is the inside layer (i.e., innermost layer) of the package, this inside layer being in direct contact with the food. As used herein, the phrases "food-contact surface" and "meat-contact surface" refer to an outer surface of a food contact layer, this outer surface being in direct contact with the food within the package.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyacrylonitrile, etc., as known to those of skill in the art.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. The term laminate is also inclusive of coextruded multilayer films comprising one or more tie layers.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film. Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. Nos. 4,302,565, to GOEKE, et. al., and 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), narrow melting point range, and single melt point behavior. The molecular weight distribution ($M_w/M_n$), also known as "polydispersity," may be determined by gel permeation chromatography. Homogeneous ethylene/alpha-olefin copolymers which can be used in the present invention preferably have an $M_w/M_n$ of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene- 1.

Processes for preparing and using homogeneous polymers are disclosed in U.S. Pat. Nos. 5,206,075, to HODGSON, Jr., 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto in their respective entireties.

Still another species of homogeneous ethylene/alpha-olefin copolymers is disclosed in U.S. Pat. Nos. 5,272,236, to LAI, et. al., and 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY™ resins, and ENGAGE™ resins, available from the Dow Chemical Company, of Midland, Mich.), as well as TAFMER™ linear homogeneous ethylene/alpha-olefin copolymer resins obtainable from the Mitsui Petrochemical Corporation. Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT™ resin, and TAFMER™ resin, this latter group of resins has a relatively large number of short branches rather than the longer branches present in LDPE and MDPE. AFFINITY™ resins and ENGAGE™ resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin, polyamide, polyester, and polyvinyl chloride.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards,* Vol. 08.02, pp. 368–371, which is hereby incorporated, in its entirety, by reference thereto.

Although the films used in the patch bag according to the present invention can be monolayer films or multilayer films, the patch bag comprises at least two films laminated together. Preferably, the patch bag is comprised of films which together comprise a total of from 2 to 20 layers; more preferably, from 2 to 12 layers; and still more preferably, from 4 to 9 layers.

In general, the multilayer film(s) used in the present invention can have any total thickness desired, so long as the film provides the desired properties for the particular packaging operation in which the film is used, e.g. abuse-resistance (especially puncture-resistance), modulus, seal strength, optics, etc.

Figure 2:
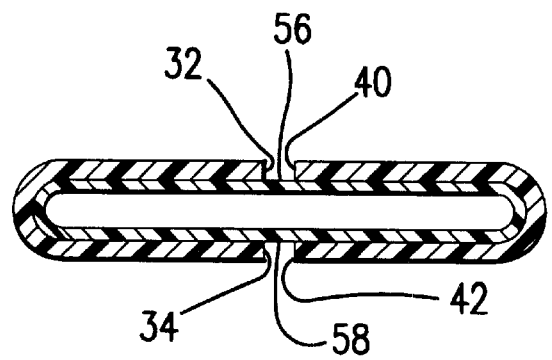
FIG. 2 illustrates a cross-sectional view of the end-seal patch bag illustrated in FIG. 1, taken through section 2—2 of FIG. 1.

FIG. 1 is a side-view illustration of a preferred patch bag 20, in a lay-flat position, this patch bag being in accord with the present invention; FIG. 2 is a cross-sectional view of patch bag 20 taken through section 2—2 of FIG. 1. Viewing FIGS. 1 and 2 together, patch bag 20 comprises bag 22, left patch 24, and right patch 26. Patch bag 20 has end-seal 28, which is through uncovered portion 30 bag 22. Left patch 24 has first patch longitudinal edge 32, which is on a first lay-flat side of the bag, and second patch longitudinal edge 34, which is on a second lay-flat side of the bag, as well as patch top edge 36, and patch bottom edge 38. Likewise, right patch 26 has first patch longitudinal edge 40, which is also on the first lay-flat side of the bag, and second patch longitudinal edge 42, which is on the second lay-flat side of the bag, as well as patch top edge 44, and patch bottom edge 46. As is apparent from FIG. 2, left patch 24 covers a first side edge 48 of patch bag 20, whereas right patch 26 covers a second side edge 50 of patch bag 20.

That portion of bag 22 to which patches 24 and 26 are adhered is "covered" by the patches. On bag 22, upper end portion 52 and lower end portion 30 are not covered by patches. It is less difficult to seal through the uncovered portion of bag 22, as opposed to sealing through both the bag and the patches, especially when the seal across the bag would have to include, for example, uncovered regions 56 and 58 between the longitudinal edges of patches 24 and 25.

Figure 3:
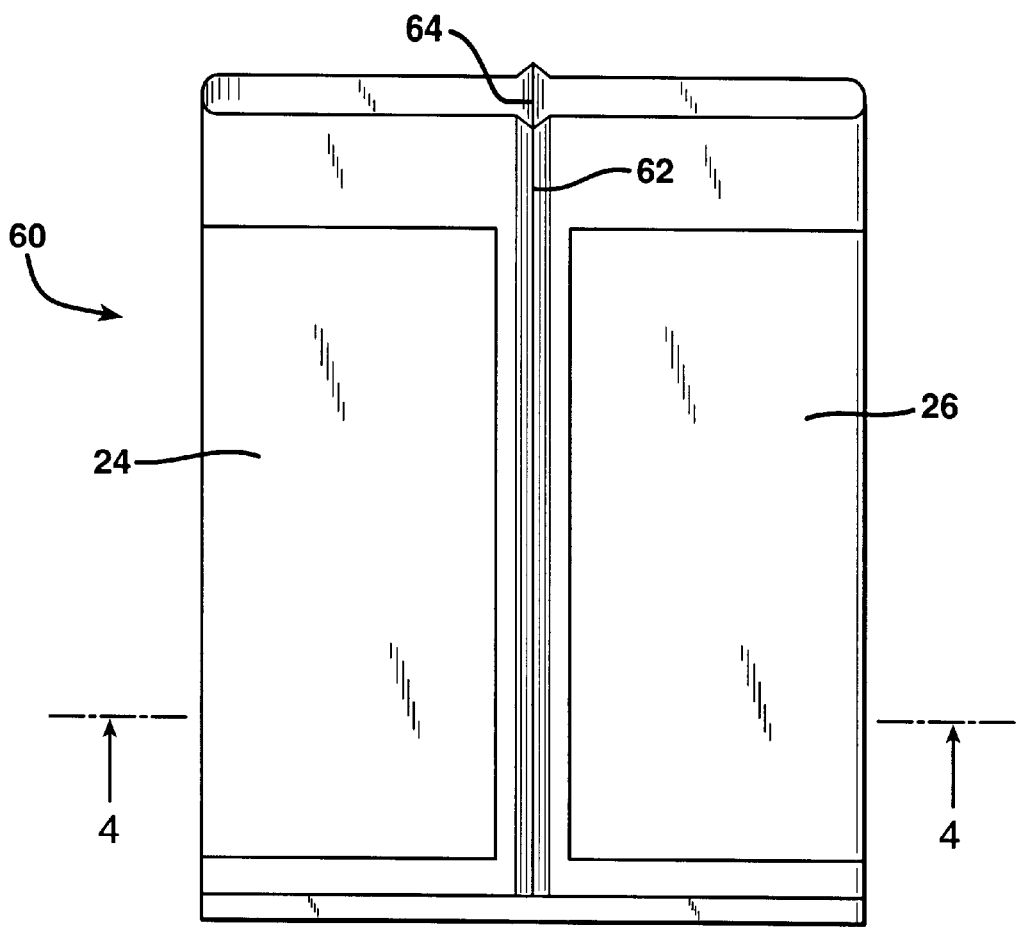
FIG. 3 illustrates a schematic view of a comparative end-seal patch bag having a problematic crease through its length.
Figure 4:
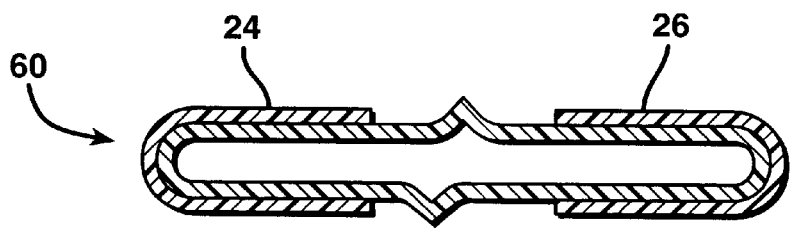
FIG. 4 illustrates a cross-sectional view through section 4—4 of the comparative end-seal patch bag illustrated in FIG. 3.

It should be noted that patch bag 20 does not have a crease running longitudinally between left patch 24 and right patch 26. Normally, using the process set forth in U.S. Pat. No. 5,540,646, to Williams et al. (hereby incorporated in its entirety, by reference thereto), creases are present in a region running down the length of the bag, i.e., close to, but spaced from, the longitudinal edges of the patches in such an end-seal patch bag. Such a patch bag 60 is illustrated in FIGS. 3 and 4. In FIGS. 3 and 4, patch bag 60 is similar to patch bag 20 illustrated in FIGS. 1 and 2, except that patch bag 60 has lengthwise creases 62 and 64 between patches 24 and 26. Creases 62 and 64 are believed to cause a seal defect problem which has been solved by removal of the crease in the process of making patch bag 20 illustrated in FIGS. 1 and 2.

FIG. 4 provides some insight into the nature of the sealing problem. The problem stems from the interference with sealing caused by the creases, which during the production of the patch bag are relocated from the lay-flat side edges of the tubing to the interior of the lay-flat sides of the tubing. This relocation is a result of the general process by which the patch bags can be made, i.e., the general process illustrated in FIGS. 10 and 11, described in detail below. As can be visualized in view of FIG. 4, a seal bar coming down against protruding creases 62 and 64 will meet with a resistance to flattening out at the creases. It has been found that about 3 percent of the seals contain a faint line therethrough at the location of one or both of the creases. This line has been found to be a weak spot in the seal, and is believed to be more susceptible to leakage in the packaging of, for example, a fresh meat product, such as fresh pork.

Figure 5:
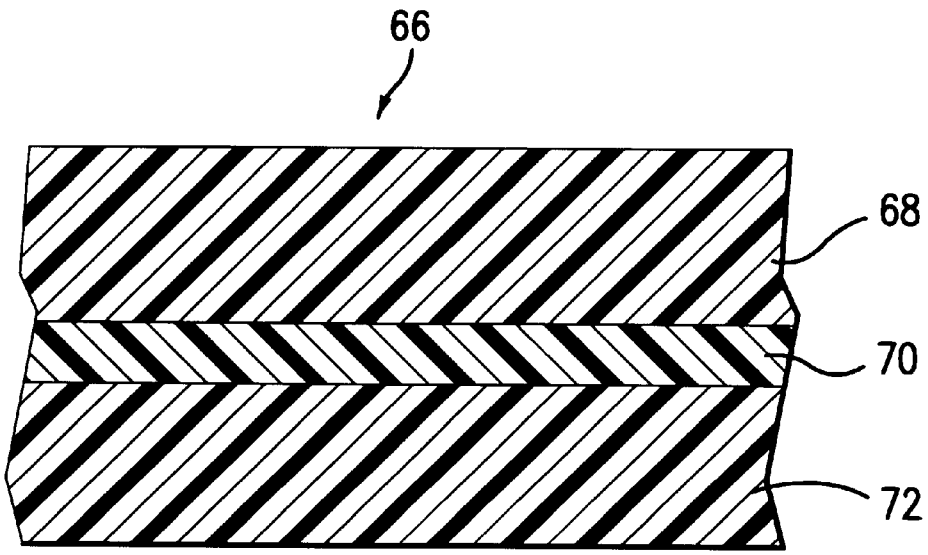
FIG. 5 illustrates a cross-sectional schematic view of a multilayer film which is a preferred patch film.

FIG. 5 illustrates a cross-sectional view of preferred multilayer film 66 for use as the stock material from which patches 24 and 26 are formed. Multilayer film 66 has a physical structure, in terms of number of layers, layer thickness, and layer arrangement and orientation in the patch bag, and a chemical composition in terms of the various polymers, etc. present in each of the layers, as set forth in Table I, below.

TABLE 1

| Layer Designation | Layer Function | Chemical Composition of Layer | Layer Thickness (mils) |
| --- | --- | --- | --- |
| 68 | outside & puncture resistant | 87% LLDPE #1 10% EVA #1 3% antiblock masterbatch | 2.0 |
| 70 | tie | EVA #2 | 0.7 |
| 72 | inside and puncture-resistant | 87% LLDPE #1 10% EVA #1 3% antiblock masterbatch | 2.0 |

LLDPE #1 was DOWLEX 2045™ linear low density polyethylene, obtained from the Dow Chemical Company of Midland, Mich. EVA #1 was ELVAX 3128™ ethylene/vinyl acetate copolymer having a 9% vinyl acetate content, obtained from E.I. DuPont de Nemours, of Wilmington, Del. EVA #2 was ELVAX 3175 GC™ ethylene/vinyl acetate copolymer having a 28% vinyl acetate content, obtained from E.I. DuPont de Nemours, of Wilmington, Del. Antiblock masterbatch #1 was used in either of two different grades. The first grade, a clear masterbatch, was a masterbatch known as 10,075 ACP SYLOID CONCENTRATE™ obtained from Technor Apex Co. of Pautucket, R.I. The second grade, a crime colored masterbatch, was a masterbatch known as EPC 9621C CREAM COLOR SYLOID CONCENTRATE™, also obtained from Technor Apex Co. of Pautucket, R.I. The primary difference between these two masterbatches is that of color, which is both aesthetic, and potentially functional in that photosensor alignment means for accurate registration of the patches on the bags can utilize the coloration in the patch for detection of the location of the patch. Preferably, the film stock from which the patches are cut has a total thickness of from about 2 to 8 mils; more preferably, from about 3 to 6 mils.

Figure 6:
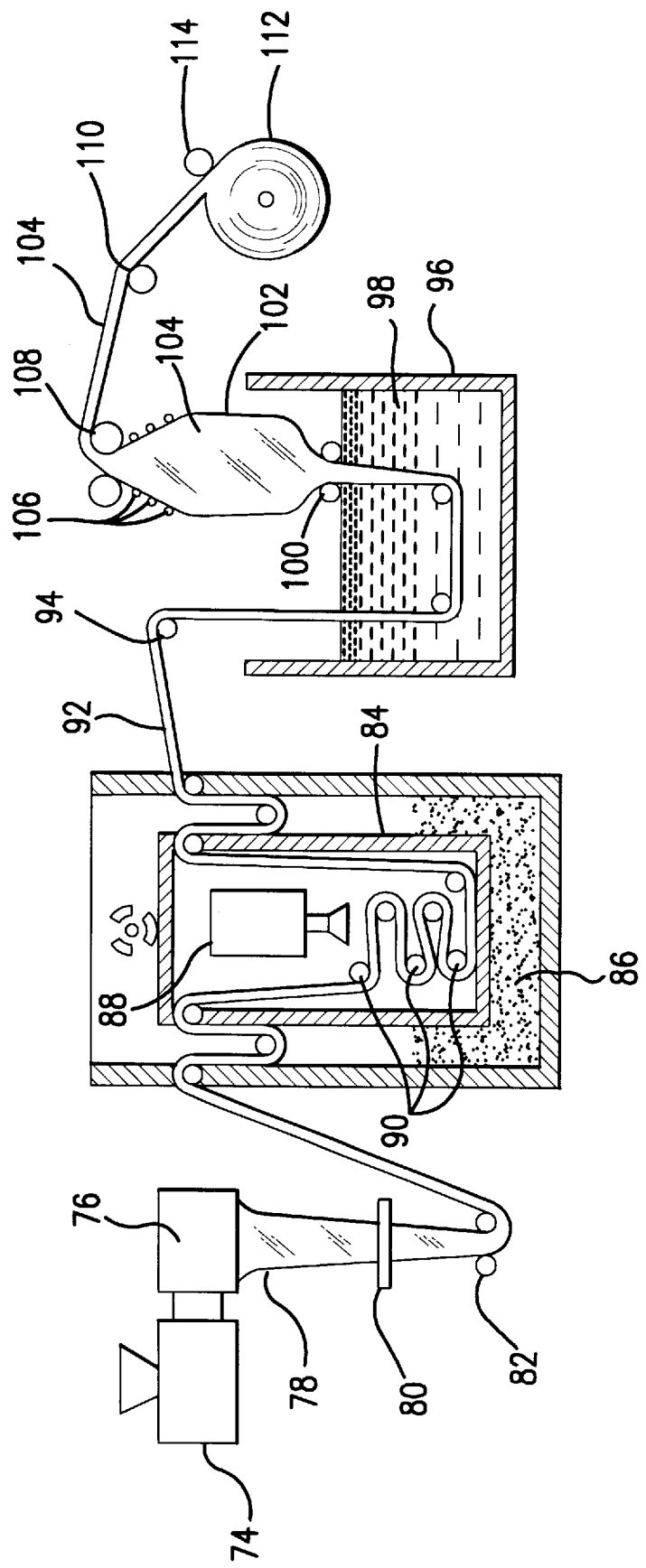
FIG. 6 illustrates a schematic view of a process for making a multilayer, biaxially-oriented, heat-shrinkable patch film.

FIG. 6 illustrates a schematic of a preferred process for producing the multilayer film of FIG. 5. In the process illustrated in FIG. 6, solid polymer beads (not illustrated) are fed to a plurality of extruders 74 (for simplicity, only one extruder is illustrated). Inside extruders 74, the polymer beads are forwarded, melted, and degassed, following which the resulting bubble-free melt is forwarded into die head 76, and extruded through annular die, resulting in tubing 78 which is 5–40 mils thick, more preferably 20–30 mils thick, still more preferably, about 25 mils thick.

After cooling or quenching by water spray from cooling ring 80, tubing 78 is collapsed by pinch rolls 82, and is thereafter fed through irradiation vault 84 surrounded by shielding 86, where tubing 78 is irradiated with high energy electrons (i.e., ionizing radiation) from iron core transformer accelerator 88. Tubing 78 is guided through irradiation vault 84 on rolls 90. Preferably, the irradiation of tubing 56 is at a level of about 7 MR.

After irradiation, irradiated tubing 92 is directed over guide roll 94, after which irradiated tubing 92 passes into hot water bath tank 96 containing water 98. The now collapsed irradiated tubing 92 is submersed in the hot water for a retention time of at least about 5 seconds, i.e., for a time period in order to bring the film up to the desired temperature, following which supplemental heating means (not illustrated) including a plurality of steam rolls around which irradiated tubing 92 is partially wound, and optional hot air blowers, elevate the temperature of irradiated tubing 92 to a desired orientation temperature of from about 240° F.–250° F. Thereafter, irradiated film 92 is directed through nip rolls 100, and bubble 102 is blown, thereby transversely stretching irradiated tubing 92. Furthermore, while being blown, i.e., transversely stretched, irradiated film 92 is drawn (i.e., in the longitudinal direction) between nip rolls 100 and nip rolls 108, as nip rolls 108 have a higher surface speed than the surface speed of nip rolls 100. As a result of the transverse stretching and longitudinal drawing, irradiated, biaxially-oriented, blown tubing film 104 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 102 is maintained between pinch rolls 100 and 108, blown tubing 104 is collapsed by rolls 106, and thereafter conveyed through pinch rolls 108 and across guide roll 110, and then rolled onto wind-up roll 112. Idler roll 114 assures a good wind-up.

Preferably, the stock film from which the bag is formed has a total thickness of from about 1.5 to 5 mils; more preferably, about 2.5 mils. Preferably the stock film from which the bag is formed is a multilayer film having from 3 to 7 layers; more preferably, 4 layers.

Figure 7:
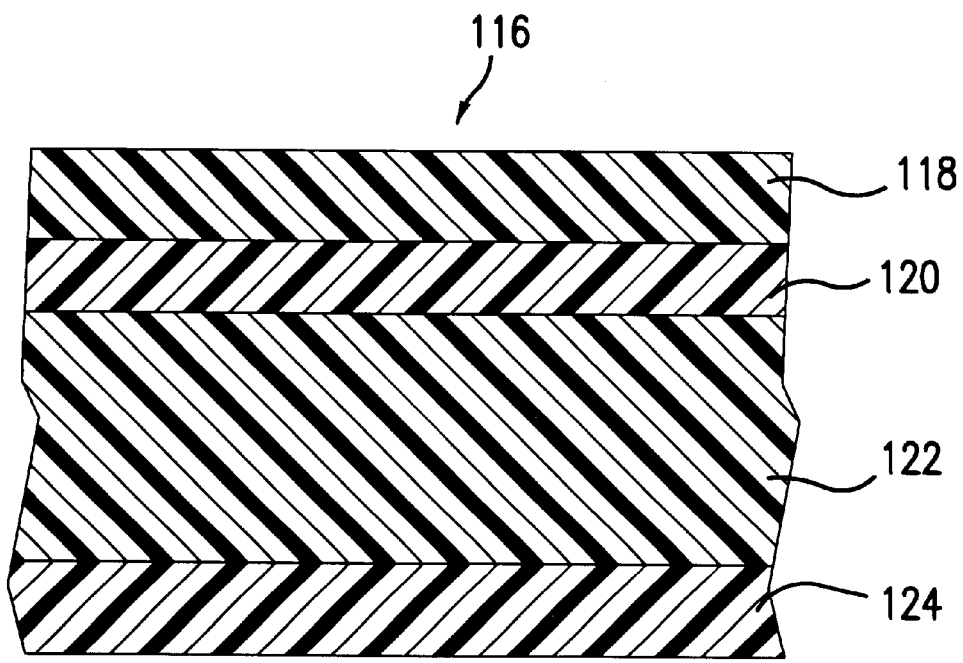
FIG. 7 illustrates a schematic view of a preferred process for making a multilayer, biaxially-oriented, heat-shrinkable bag film.

FIG. 7 illustrates a cross-sectional view of preferred multilayer film 116 for use as the tubing film stock from which bag 22 is formed. Multilayer film 116 has a physical structure, in terms of number of layers, layer thickness, and layer arrangement and orientation in the patch bag, and a chemical composition in terms of the various polymers, etc. present in each of the layers, as set forth in Table II, below.

TABLE II

| Layer Designation | Layer Function | Chemical Composition of Layer | Layer Thickness (mils) |
|---|---|---|---|
| 118 | outside & puncture resistant | EVA #1 | 0.56 |
| 120 | O$_2$-barrier | 96% VDC/MA #1; 2% epoxidized soybean oil; 2% bu-A/MA/bu-MA terpolymer | 0.2 |
| 122 | puncture-resistance | 80% LLDPE #1 20% EBA #1 | 1.25 |
| 124 | sealant and inside | EVA #1 | 0.33 |

EVA #1 was the same ethylene/vinyl acetate copolymer described above. VDC/MA #1 was SARAN MA-134 ™ vinylidene chloride/methyl acrylate copolymer, obtained from the Dow Chemical Company. The epoxidized soybean oil was PLAS-CHEK 775™ epoxidized soybean oil, obtained from the Bedford Chemical Division of Ferro Corporation, of Walton Hills, Ohio. Bu-A/MA/bu-MA terpolymer was METABLEN L-1000™ butyl acrylate/methyl methacrylate/butyl methacrylate terpolymer, obtained from Elf Atochem North America, Inc., of 2000 Market Street, Philadelphia, Pa. 19103. EBA #1 was EA 705-009™ ethylene/butyl acrylate copolymer containing 5% butyl acrylate, obtained from the Quantum Chemical Company of Cincinnati Ohio. Alternatively, EBA #1 can be EA 719-009™ ethylene/butyl acrylate copolymer, having a butyl tent of 18.5%, also obtained from Quantum Chemical Company.

Figure 8:
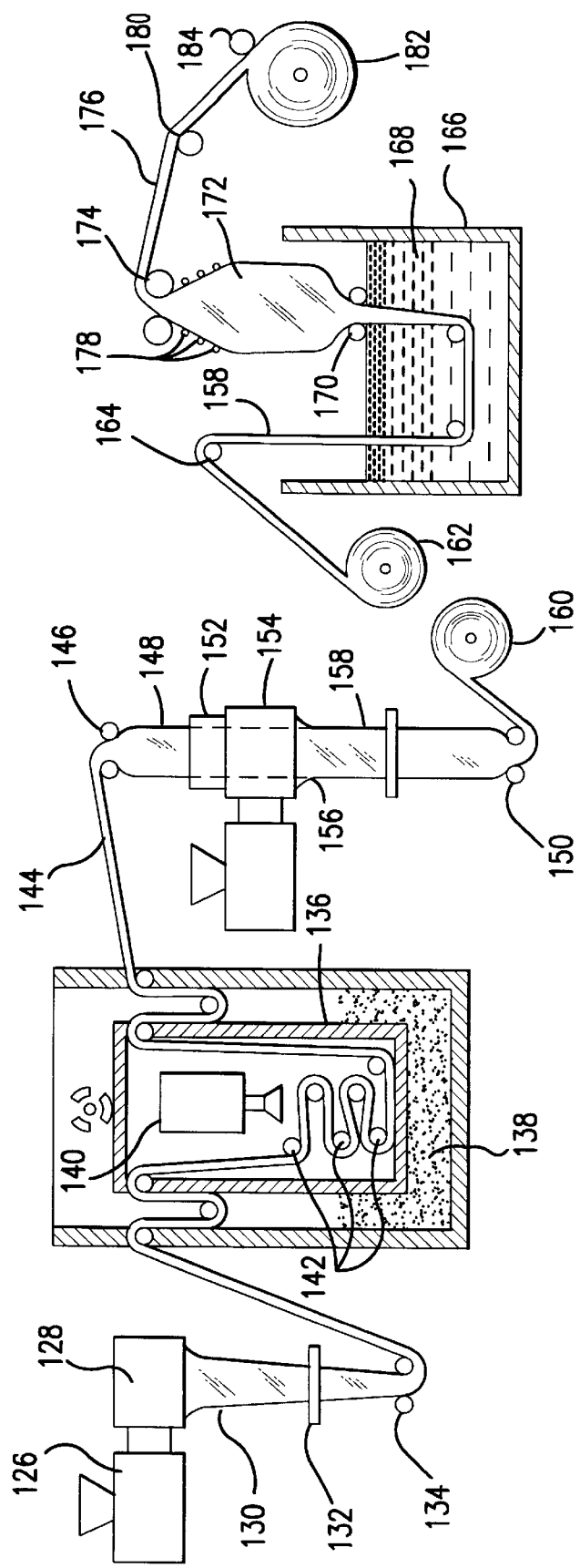
FIG. 8 illustrates a schematic view of a preferred process for making a multilayer, biaxially-oriented, heat-shrinkable patch film.

FIG. 8 illustrates a schematic of a preferred process for producing the multilayer film of FIG. 7. In the process illustrated in FIG. 8, solid polymer beads (not illustrated) are fed to a plurality of extruders 126 (for simplicity, only one extruder is illustrated). Inside extruders 126, the polymer beads are forwarded, melted, and degassed, following which the resulting bubble-free melt is forwarded into die head 128, and extruded through an annular die, resulting in tubing 130 which is 10–30 mils thick, more preferably 15–25 mils thick.

After cooling or quenching by water spray from cooling ring 132, tubing 130 is collapsed by pinch rolls 134, and is thereafter fed through irradiation vault 136 surrounded by shielding 138, where tubing 130 is irradiated with high energy electrons (i.e., ionizing radiation) from iron core transformer accelerator 140. Tubing 130 is guided through irradiation vault 136 on rolls 142. Preferably, tubing 130 is irradiated to a level of about 4.5 MR.

After irradiation, irradiated tubing 144 is directed through pinch rolls 146, following which tubing 144 is slightly inflated, resulting in trapped bubble 148. However, at trapped bubble 148, the tubing is not significantly drawn longitudinally, as the surface speed of nip rolls 150 are about the same speed as nip rolls 146. Furthermore, irradiated tubing 144 is inflated only enough to provide a substantially circular tubing without significant transverse orientation, i.e., without stretching.

Slightly inflated, irradiated tubing 148 is passed through vacuum chamber 152, and thereafter forwarded through coating die 154. Second tubular film 156 is melt extruded from coating die 154 and coated onto slightly inflated, irradiated tube 148, to form two-ply tubular film 158. Second tubular film 156 preferably comprises an O$_2$ barrier layer, which does not pass through the ionizing radiation. Further details of the above-described coating step are generally as set forth in U.S. Pat. No. 4,278,738, to BRAX et. al., which is hereby incorporated by reference thereto, in its entirety.

After irradiation and coating, two-ply tubing film 158 is wound up onto windup roll 160. Thereafter, windup roll 160 is removed and installed as unwind roll 162, on a second stage in the process of making the tubing film as ultimately desired. Two-ply tubular film 158, from unwind roll 162, is unwound and passed over guide roll 164, after which two-ply tubular film 158 passes into hot water bath tank 166 containing water 168. The now collapsed, irradiated, coated tubular film 158 is submersed in hot water 168 (having a temperature of about 210° F.) for a retention time of at least about 5 seconds, i.e., for a time period in order to bring the film up to the desired temperature for biaxial orientation. Thereafter, irradiated tubular film 158 is directed through nip rolls 170, and bubble 172 is blown, thereby transversely stretching tubular film 158. Furthermore, while being blown, i.e., transversely stretched, nip rolls 174 draw tubular film 158 in the longitudinal direction, as nip rolls 174 have a surface speed higher than the surface speed of nip rolls 170. As a result of the transverse stretching and longitudinal drawing, irradiated, coated biaxially-oriented blown tubing film 176 is produced, this blown tubing preferably having been both stretched in a ratio of from about 1:1.5–1:6, and drawn in a ratio of from about 1:1.5–1:6. More preferably, the stretching and drawing are each performed a ratio of from about 1:2–1:4. The result is a biaxial orientation of from about 1:2.25–1:36, more preferably, 1:4–1:16. While bubble 172 is maintained between pinch rolls 170 and 174, blown tubing 176 is collapsed by rolls 178, and thereafter conveyed through pinch rolls 174 and across guide roll 180, and then rolled onto wind-up roll 182. Idler roll 184 assures a good wind-up.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

The multilayer films used to make the patch bag of the present invention are preferably irradiated to induce crosslinking, as well as corona treated to roughen the surface of the films which are to be adhered to one another. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons is in the range of up to about 12 MR, more preferably about 2 to about 9 MR, and still more preferably, about 3 MR. Preferably, irradiation is carried out by an electron accelerator and the dosage level is determined by standard dosimetry methods.

Other accelerators such as a Vander Graff or resonating transformer may be used. The radiation is not limited to electrons from an accelerator since any ionizing radiation may be used. The unit of ionizing radiation generally used is the rad, hereinafter referred to as "RAD", which is defined as the amount of radiation which will result in the absorption of 100 ergs of energy per gram of irradiated material. The megarad, hereinafter referred to as "MR", is one million ($10^6$) RAD. The ionizing radiation crosslinks the polymers in the film. Preferably, the film is irradiated at a level of from 2–15 MR, more preferably 2–10 MR, still more preferably, about 7 MR. As can be seen from the descriptions of preferred films for use in the present invention, the most preferred amount of radiation is dependent upon the film and its end use.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

Corona treatment of polymeric materials is disclosed in U.S. Pat. No. 4,120,716, to BONET, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to HOFFMAN, also hereby incorporated in its entirety by reference thereto, discloses the use of corona discharge for the treatment of plastic webs for use in meat cook-in packaging, with the corona treatment of the inside surface of the web to increase the adhesion of the meat to the adhesion of the meat to the proteinaceous material.

Although corona treatment is a preferred treatment of the multilayer films used to make the patch bag of the present invention, plasma treatment of the film may also be used.

In the bag-making process, if an end-seal patch bag is the desired product, the tubing having the first and second patches adhered thereto is sealed and cut so that an end-seal bag is produced. As is known to those of skill in the art, a side seal bag can also be produced in a similar manner.

Figure 9:
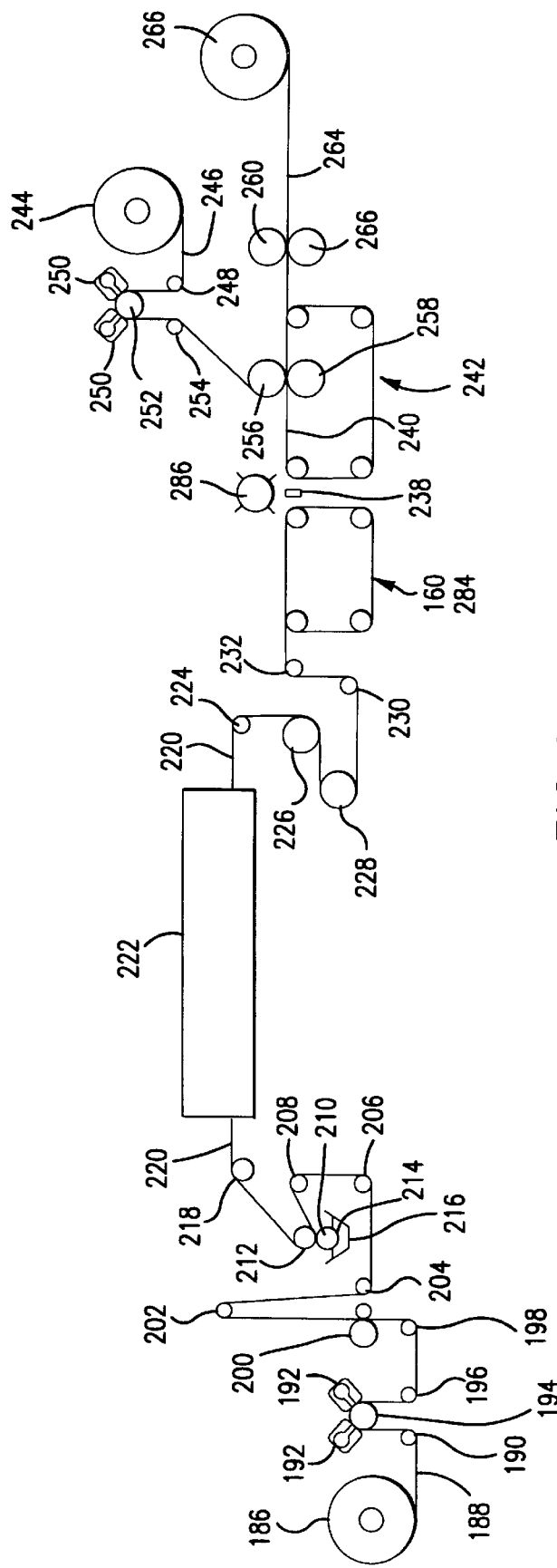
FIG. 9 illustrates a schematic view of a general process for making patch bags.
Figure 10:
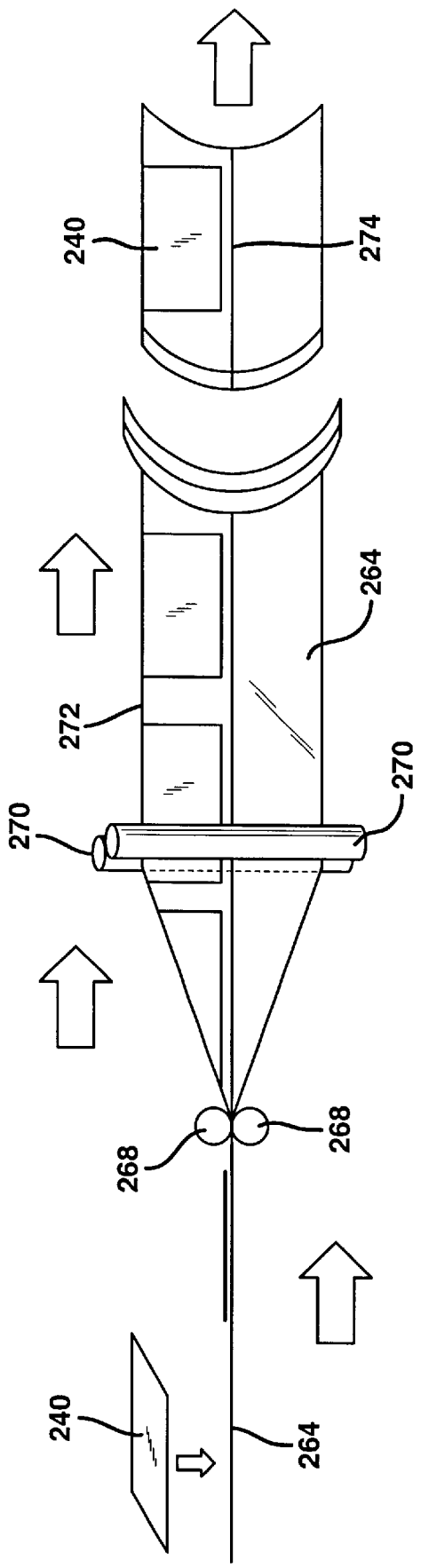
FIG. 10 illustrates a schematic view of a specific process step for making a patch bag having a patch covering a side edge of the bag.
Figure 11:
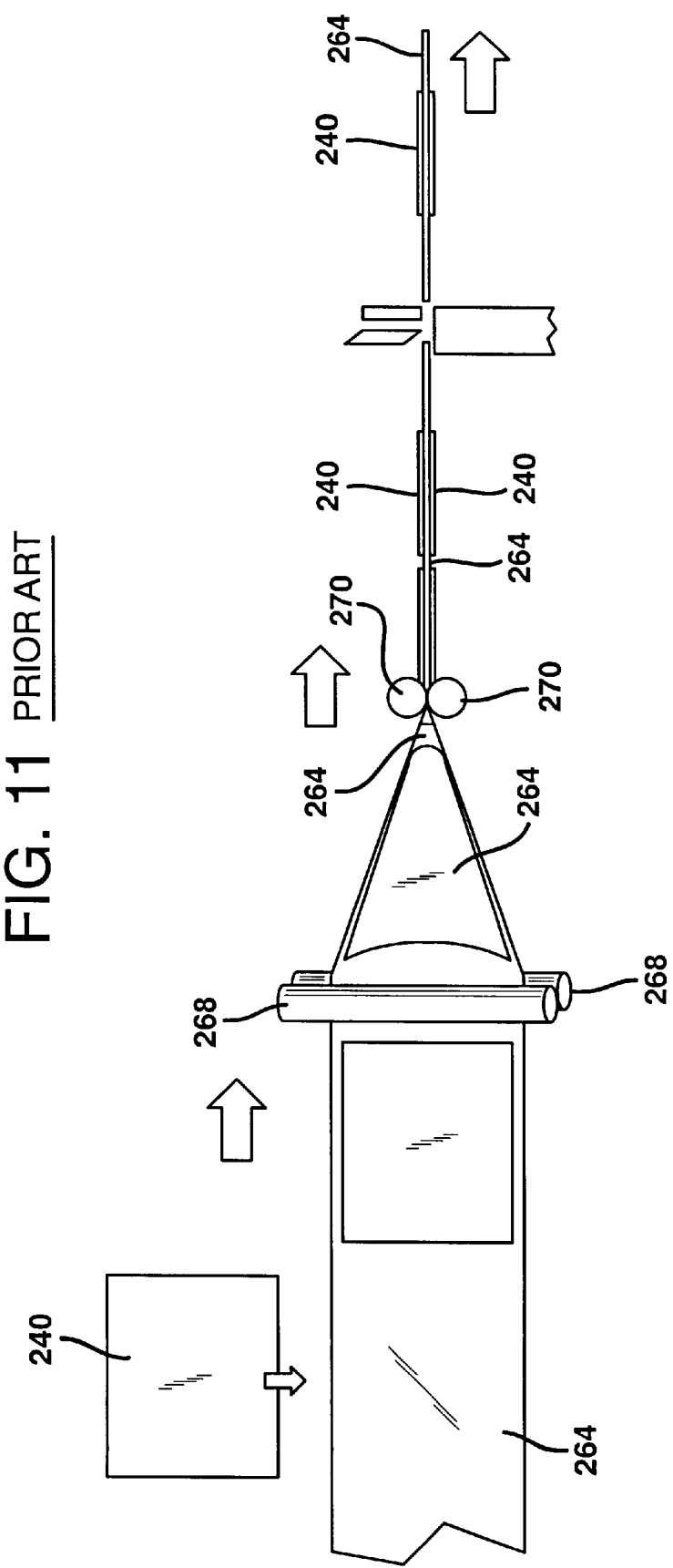
FIG. 11 illustrates a schematic view of a specific process step for the elimination of creases in the process of making a patch bag according to the present invention.
Figure 12:
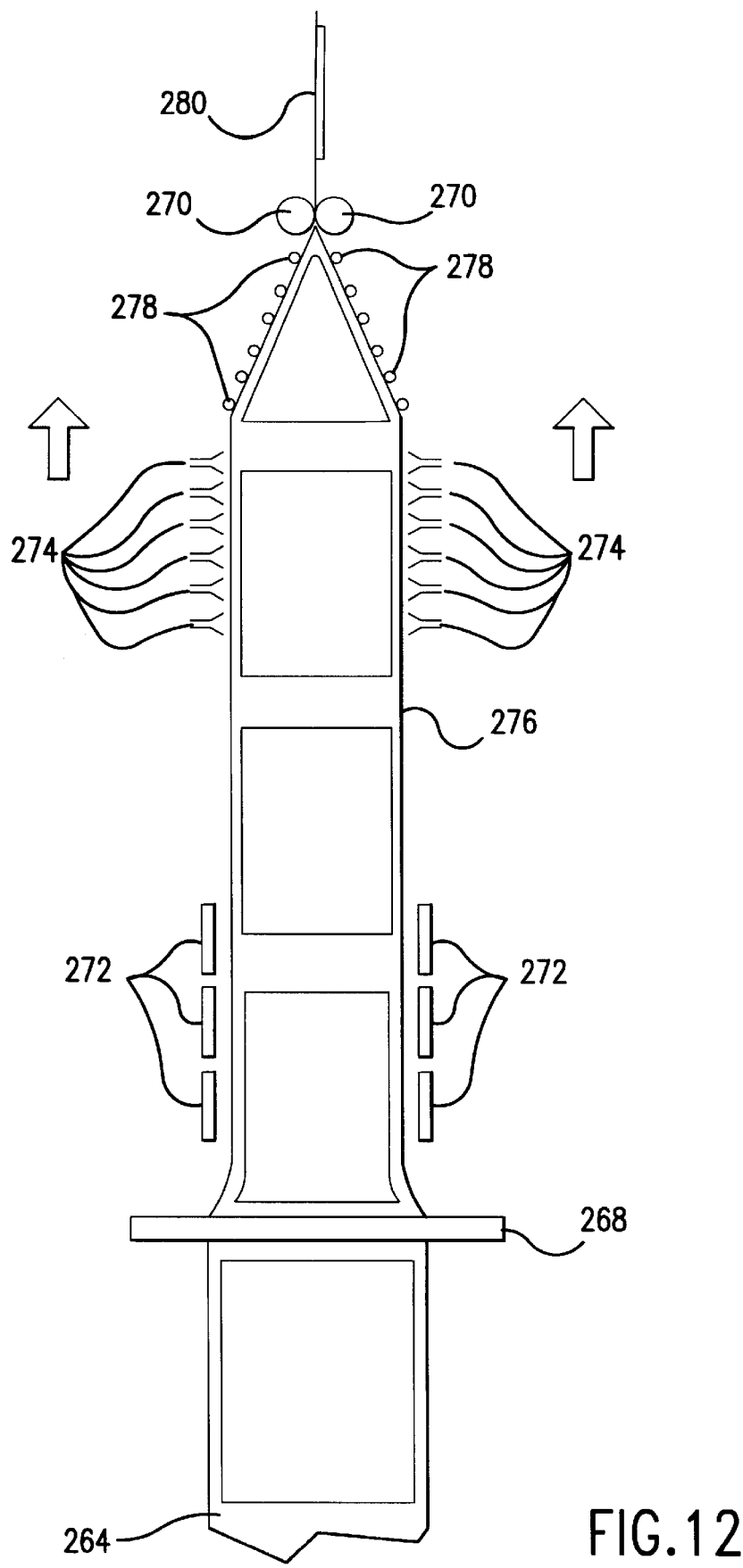
FIG. 12 illustrates a packaged product in accordance with the present invention.

FIG. 9 illustrates a schematic representation of a general process for manufacturing a patch bags, and if used in conjunction with the specific process steps illustrated in FIGS. 10, 11, and 12, can be used to make a patch bag according to the present invention (e.g., a patch bag as illustrated in FIGS. 1, and 2, described above.

THE GENERAL PROCESS OF FIG. 9

In FIG. 9, patch film roll 186 supplies patch film 188, i.e., preferably the preferred patch film described above. Patch film 188 is directed, by idler roll 190, to corona treatment devices 192 which subject the upper surface of patch film 188 to corona treatment as patch film 188 passes over corona treatment roll 194. After corona treatment, patch film 188 is directed, by idler rolls 196 and 198, into (optional) printing roll 200.

Patch film 188 is thereafter directed over idler rolls 202, 204, 206, and 208, after which patch film 188 is passed between a small gap (i.e., a gap wide enough to accommodate patch film 188 passing therethrough while receiving an amount of adhesive which corresponds with a dry coating, i.e., weight after drying, of about 45 milligrams per 10 square inches of patch film) between adhesive application roll 210 and adhesive metering roll 212. Adhesive application roll 210 is partially immersed in adhesive 214 supplied to trough 216. As adhesive application roll 210 rotates counter-clockwise, adhesive 214, picked up by the immersed surface of adhesive application roll 210, moves upward, contacts, and is metered onto, the full width of one side of patch film 188, moving in the same direction as the surface of adhesive roll 210. [Examples of suitable types of adhesives include thermoplastic acrylic emulsions, solvent based adhesives and high solids adhesives, ultraviolet-cured adhesive, and electron-beam cured adhesive, as known to those of skill in the art. The presently preferred adhesive is a thermoplastic acrylic emulsion known as RHOPLEX N619™ thermoplastic acrylic emulsion, obtained from the Rohm & Haas Company, at Dominion Plaza Suite 545, 17304 Preston Rd., Dallas, Tex. 75252, Rohm & Haas having headquarters at 7th floor, Independence Mall West, Philadelphia, Pa. 19105.] Patch film 188 thereafter passes so far around adhesive metering roll 212 (rotating clockwise) that the adhesive-coated side of patch film 188 is in an orientation wherein the adhesive is on the top surface of patch film 188, as adhesive-coated patch film 188 moves between adhesive metering roll 212 and idler roll 218.

Thereafter, adhesive-coated patch film 220 is directed over drying oven entrance idler roll 218, and passed through oven 222 within which adhesive-coated patch film 220 is dried to a degree that adhesive 214 on adhesive-coated patch film 220 becomes tacky. Upon exiting oven 222, adhesive-coated patch film 220 is directed partially around oven-exit idler roll 224, following which patch film 220 is cooled on chill rolls 226 and 228, each of which has a surface temperature of about 40–45° F., and a diameter of about 12 inches. The cooling of patch film 220 is carried out in order to stabilize patch film 220 from further shrinkage.

Thereafter, patch film 220 is directed, by idler rolls 230 and 232, onto a belt of pre-cutting vacuum conveyor assembly 234, and thereafter forwarded to a rotary scissors-type knife having upper rotary blade assembly 236 and lower blade 238, the knife cutting across the width of patch film 220 in order to form patches 240. Patches 240 are forwarded and held on top of a belt of post-cutting vacuum conveyor assembly 242. While patches 240 are held on the belt of post-cutting vacuum conveyor assembly 242, tubing-supply roll 244 supplies biaxially oriented, lay-flat bag film tubing 246, which is directed, by idler roll 248, to corona treatment devices 250 which subject the upper surface of lay-flat bag film tubing 246 to corona treatment as lay-flat bag film tubing 246 passes over corona treatment roll 252. After corona treatment, lay-flat bag film tubing 246 is directed, by idler roll 254, partially around the surface of upper pre-lamination nip roll 256, and through the nip between upper prelaminating nip roll 256 and lower prelaminating nip roll 258, the pre-laminating nip rolls being above and below the post-cutting vacuum conveyor belt. Prelaminating nip rolls 256 and 258 position patches 240 onto the now lower, corona-treated outside surface of lay-flat bag film tubing 246. After passing through the nip between prelaminating nip rolls 256 and 258, lay-flat bag film tubing 246, having patches 240 laminated intermittently thereon, exits off the downstream end of the post-cutting vacuum conveyor assembly 242, and is directed through the nip between upper laminating nip roll 260 and lower laminating nip roll 262, these rolls exerting pressure (about 75 psi) in order to secure patches 240 to lay-flat bag film tubing 246, to result in patch-laminated lay-flat tubing 264. Thereafter, patch-laminated lay-flat tubing 264 is wound up to form rewind roll 266, with rewind roll 266 having the laminated patches thereon oriented towards the outer-facing surface of rewind roll 266.

In a subsequent process not separately illustrated, rewind roll 266 is removed from its winder and is positioned in the place of tubing supply roll 244, and the process of FIG. 9, described immediately above, is repeated, wherein a second set of patches is laminated to patch-laminated lay-flat bag film tubing 266, this second set of patches being applied to the other side of patch-laminated lay-flat tubing 266. Of course, the second set of patches are accurately aligned and registered so that they are substantially aligned with the positioning of the first set of patches laminated to lay-flat bag film tubing 246. In order to achieve accurate alignment, photosensors (i.e., photoeyes, etc.), not illustrated, are used to detect the location of the patch. Appropriate locations for such photosensors are upstream and downstream of upper pre-lamination nip rolls 256 and 258.

Patches 240 have a width less than the width of lay-flat bag film tubing 246, so that the patches respectively: leave uncovered regions along the sides of lay-flat bag film tubing 246. The first set of patches applied are preferably matched up, i.e., substantially aligned, with the patch overhangs of the second set of patches, i.e., applied to the second (uncovered) side of lay-flat bag film tubing 246.

Once both sets of patches have been applied to lay-flat bag film tubing 246, the resulting "two-patch tubing" is directed into a bag-making machine, in which patch-laminated lay-flat tubing 266 is converted into end-seal bags or side-seal bags. FIGS. 10 and 11 together provide a schematic illustration of such a process, in which a patch covers at segment of a side edge of each end-seal bag made by the process. FIGS. 10 and 11 illustrate the same process, viewed from perspectives at right angles to one another. That is, while FIG. 10 is a side view of the bagmaking process, FIG. 11 is a view from above the same process. In the processes illustrated in FIGS. 10 and 11, patch-laminated lay-flat tubing 264 is forwarded through a first set of nip rollers 268. Thereafter, tubing 264 is inflated (preferably with air) by a trapped gas bubble between the first set of nip rollers 268 and a second set of nip rollers 270. The second pair of nip rollers is oriented about 90 degrees off-parallel relative to the first pair of nip rollers. The result is that the patch-laminated lay-flat tubing 264 is reconfigured so that the patch now covers a segment of the newly-established lay-flat side edge 272 of the tubing. The now-reconfigured patch-laminated lay-flat tubing is sealed and cut in order to form individual patch bags.

The process illustrated in FIGS. 10 and 11 can be used to make a patch bag having a patch which covers at least a portion of the side edge of the resulting bag. However, the process illustrated in FIGS. 10 and 11 requires a seal across a crease 274 which is retained in the bag tubing from the production of the tubing. FIG. 12 illustrates a process for removal of creases 274, so that the sealing and cutting can take place without having to seal across creases 274 which have been repositioned to a region within the lay-flat sides of the reconfigured patch-laminated tubing.

The process illustrated in FIG. 12 takes place between the first pair of nip rollers 268 and the second pair of nip rollers 270 which are also illustrated in FIGS. 10 and 11. In FIG. 12, patch-laminated lay-flat tubing 264 is fed through a first pair of nip rollers 268. Tubing 264 is then fed upward, i.e., vertically upward, to a second pair of nip rollers 270 which are oriented 90 degrees from first nip rollers 268. That portion of tubing 264 between the first pair of nip rollers 268 and the second pair of nip rollers 270 is inflated with air such that the tubing 264 is taught due to the amount of gas (preferably air) in the trapped bubble.

The crease removal process occurs between the two pairs of nip rollers 268 and 270. The crease removal process can be seen as involving five stages: (1) a transition section in which the patch-laminated lay-flat tubing is inflated to a circular cross section; (2) a heating section in which two regions of the tubing, each of which include a crease, are heated {preferably to between 160 to 170° F.); (3) a relaxation section, where the creases are pulled flat by virtue of both: (a) the pressure within the tubing of from about 1 to 18 inches of water (more preferably, 1 to 8 inches of water; still more preferably, 2 to 3 inches of water), and (b) the heat-shrinkable nature of the tubing film; (4) a cooling section in which the heated regions of the tubing are cooled to between 85 and 110° F.; and (5) a converging zone where the tubing is collapsed into lay-flat tubing again, but with the patch material oriented around the lateral edges of the tubing. In the heating section, preferably the films are preferred patch and bag films, and preferably the heated region of the film tubing reaches a temperature of from about 110° F. to 180° F., more preferably, from about 140° F. to 170° F.

It has been discovered that before the creases are removed, the creases cause a delamination of the barrier layer from the core layer. More particularly, the creasing of the tubing causes an increase in the radius of the outside layers when the tubing is originally collapsed. This increase in the outside layers is "set" into the tubing because it is wound onto a roll prior to the placement of the patches. When the tubing is opened up, as in the formation of a bubble, the outside layers, being longer than the inside layers, separate from the core layer. During bagmaking, this represents a serious bag integrity problem in that the original crease tries to re-establish itself and form a small fold in the seal.

To overcome this problem, the tubing (now in cylindrical form) is heated, only along the length of the original seal, for approximately 48 inches. The width of the heated area is approximately 1.5 inches. This section of the tubing is heated, preferably, by infrared radiation, although hot air heat could alternatively be used. A suitable infrared heater is, for example, assembly 272 which includes a quartz tube, with a Tungsten element and a reflector, internal to the lamp, which is capable of 2000 Watts of short wavelength radiation. Only about 10 to 15% of the short wavelength radiation is absorbed by the films, the remainder is lost to the environment or absorbed by the metal in the lamp holders/radiators only to be reflected and re-radiated. The lamp holders/radiators consist of a "U" shaped piece of austentitic stainless steel sheet metal, approximately 16 gauge thick, being 10 inches long, with legs 1¼ inch long and an open width of ⅞ inches. The base of the "U" is away from the bubble, with the open end of the "U" facing the bubble. The lamp is located such that it is close to the base of the "U" without facing it. The lamp's internal reflector is facing toward the bubble. There is a secondary radiator outboard of the holder, also made of stainless steel and also of the same length. These radiators are longitudinal fins which begin at the base of the "U" and extend toward the bubble, but at an angle such that the ends closest to the bubble are 1½ inches apart. During operation the lamps are operated at or near maximum power so as to maintain the temperature of the tubing between 160 and 180° F. The temperature is sensed immediately after the heating elements and the lamps controlled via a proportional-integral-derivative controller.

A preferred method of heating utilizes three 3000 Watt short wavelength lamps (quartz tubes with Tungsten elements) held in a holder such that a cross section of the longitudinal axis of the lamps yielded the shape of an equilateral triangle. Two of the three lamps would be closest to the bubble but ¾ inch apart (center to center); the third lamp would be 0.65 inches behind the other two. Behind each of these lamps is refractory material. Refractory material extends beyond the lamps on the outside and is shaped such that the radiation is reflected to a zone of about 2 inches wide on the tubing. There are three of these holders arranged vertically for a total height of 60 inches.

The relaxation zone is approximately 48 inches in length, and allows the heated regions of film 264 to begin to equilibrate with the surroundings. The original crease is pulled out in the relaxation zone. The heated section on tubing 264 cool in the relaxation zone by natural convection. The patch-laminated tubing 264 has generally been cooled to between 120 to 130° F. by the time it has reached the cooling section. The cooling section utilizes 6 WINDJET™ nozzles 274 on each side of the tubing, these nozzles being obtained from Exair Corporation, of Cincinnati, Ohio. Cooled compressed air is injected into these nozzles at the rate of 130 SCFM. The temperature of the cooling air is between room temperature and 55° F. Adjustment of the amount of cooling will determine some web handling characteristics of the tubing and is left as an operator adjustment, but can be adjusted such that the air velocity at the bubble is 8300 fpm, resulting in tubing temperatures of between 85 and 110° F. at the end of the cooling section.

After leaving the cooling section, the bubble moves into the converging section, which is of design known to those of skill in the art of film manufacture. In the converging section, inflated tubing 276 is collapsed into a second lay-flat configuration as it enters the deflate nip rollers 278. From here, the reconfigured patch-laminated lay-flat tubing 280 proceeds to be cut and sealed to form patch bags in which a patch covers at least a segment of a bag side edge or bottom edge, e.g., by the process illustrated in FIGS. 10 and 11.

The patch bags illustrated in FIGS. 1 and 2 are end-seal bags. However, side-seal bags could be made which are also in accordance with the present invention, in which the patch covers a portion of the bottom edge of the bag, and in which creases are removed from the length of the tubing before the side seals are made. In the manufacture of side-seal bags, two seals are made across the tubing and parallel to one another and close together (e.g., ½ inch apart), with the tubing thereafter being sliced between these seals, and with the one of the side edges of the tubing being sliced open to form an open side-seal bag top.

In general, the tubing is sealed using a hot bar (heat seal) or a nichrome wire fixed to a chilled metal bar (impulse seal), as is known to those of skill in the art, or any other sealing means known to those of skill in the art, such as ultrasonic radiation, radio frequency radiation, and laser. The preferred sealing means is an impulse sealer. Films which are predominantly polyethylene are generally sealed using impulse sealing or hot bar sealing. Both linear and shaped seals can be formed, as is known to those of skill in the art.

In general, sealing and cutting of tubing to produce bags is disclosed in U.S. Pat. Nos. 3,552,090, 3,383,746, and U.S. Ser. No. 844,883, filed Jul. 25, 1969, to OWEN, each of these two U.S. Patents as well as the U.S. Patent application, hereby being incorporated by reference thereto, in their entireties.

Although in general the bag according to the present invention can be used in the packaging of any product, the bag of the present invention is especially advantageous for the packaging of food products, especially fresh meat products, especially meat products comprising bone. Among the meat products which can be packaged in the films and packages according to the present invention are poultry, pork, beef, lamb, goat, horse, and fish. Still more preferably, the bag of the present invention is used in the packaging of various rib cuts, such as spareribs, back ribs, and short ribs, more particularly pork spareribs, beef back ribs, beef short ribs, and pork back ribs.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A process for making a patch bag, comprising:
    (A) adhering a patch to a first lay-flat side of a film tubing while the tubing is in a first lay-flat configuration, whereby a lay-flat tubing-patch laminate is formed, the lay-flat tubing having a first crease along a first side edge and a second crease along a second side edge;
    (B) passing the lay-flat tubing-patch laminate through a first pair of nip rolls with the tubing being inflated by a trapped bubble of gas between the first pair of nip rolls and a second pair of nip rolls, whereby an inflated tubing-patch laminate is formed;
    (C) heating a first region of the inflated tubing-patch laminate which contains the first crease, and a second region of the inflated tubing-patch laminate which contains the second crease, the heating being carried out so that each of the creases is removed;
    (D) cooling the first and second regions of the inflated tubing-patch laminate;
    (E) deflating and flattening the inflated tubing-patch laminate into a second lay-flat configuration by passing the inflated tubing-patch laminate through the second pair of nip rolls which have a nip which is oriented from about 10 to 90 degrees off-parallel relative to a nip of the first pair of nip rolls, so that a reconfigured lay-flat tubing-patch laminate is formed in which the patch covers a segment of a first new side edge of the tubing; and (F) sealing and cutting the reconfigured lay-flat tubing-patch laminate in the second lay-flat configuration so that the patch bag is formed from a segment of the tubing having the patch adhered thereto.

2. The process according to claim 1, wherein:

the first and second regions of the tubing-patch laminate are each heated to a temperature of from about 140 to 170° F.; and the cooling of the first and second regions of the tubing-patch laminate cools the first and second regions to a temperature of from about 85 to 110° F.

3. The process according to claim 2, wherein the heating is carried out by at least one member selected from the group consisting of infrared radiation and hot air, and wherein the cooling is carried out by air at from 55 to 85° F.

4. The process according to claim 2, wherein the trapped bubble in the tubing exerts a pressure of from about 1 to 18 inches of water on an inside surface of the tubing-patch composite.

5. The process according to claim 4, wherein the sealing and cutting is carried out so that a side-seal patch bag is produced, with the patch covering at least a segment of the bottom of the bag.

6. The process according to claim 5, wherein the second pair of nip rolls is oriented from about 60 to 90 degrees off-parallel relative to the first pair of nip rolls.

7. The process according to claim 6, wherein the patch is adhered to the outside surface of the tubing.

8. The process according to claim 4, wherein a first patch is adhered to a first lay-flat side of the tubing, a second patch is adhered to a second lay-flat side of the tubing, and upon deflation and flattening into the second lay-flat configuration, the first patch covers a segment of the new first side edge and the second patch covers a segment of the new second side edge; and wherein the cutting and sealing are carried out so that an end-seal patch bag is produced.

9. The process according to claim 8, wherein the tubing has a first uncovered region which is between the first patch and the second patch and which has a width of from about 0.2 inch to 2 inches, and a second uncovered region which is also between the first patch and the second patch and which also has a width of from about 0.2 to 2 inches.

10. The process according to claim 9, wherein the second pair of nip rolls is oriented about 90 degrees off-parallel relative to the first pair of nip rolls.

11. The process according to claim 10, wherein the tubing comprises a first multilayer, biaxially-oriented, heat-shrinkable film, the first patch comprises a second multilayer, biaxially-oriented, heat-shrinkable film, and the second patch comprises a third multilayer, biaxially-oriented, heat-shrinkable film.

12. The process according to claim 11, wherein:

(A) the first film comprises:
  (i) an outside abuse layer comprising at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer;
  (ii) an inner $O_2$-barrier layer comprising at least one member selected from the group consisting of ethylene/vinyl alcohol copolymer, polyvinyl chloride, polyvinylidene chloride, polyamide, polyester, polyacrylonitrile; and
  (iii) an inside sealant layer comprising at least one member selected from the group consisting of thermoplastic polyolefin, thermoplastic polyamide, thermoplastic polyester, and thermoplastic polyvinyl chloride; and (B) the second film and the third film each comprise at least one member selected from the group consisting of ethylene/alpha-olefin copolymer having a density of from about 0.85 to 0.95, propylene/ethylene copolymer, polyamide, ethylene/vinyl acetate copolymer, ethylene/methyl acrylate copolymer, and ethylene/butyl acrylate copolymer.

13. The process according to claim 12, wherein:

the first film has a total thickness of from about 1.5 to 5 mils and a total free shrink, at 185° F., of from about 20 to 120 percent;

the second film has a total thickness of from about 2 to 8 mils and a total free shrink, at 180° F., of from about 10 to 100 percent; and the third film has a total thickness of from about 2 to 8 mils and a total free shrink, at 180° F., of from about 10 to 100 percent.

14. The process according to claim 4, wherein the film tubing comprises a first biaxially-oriented film, and the patch comprises a second biaxially oriented film.

15. The process according to claim 4, wherein the patch is adhered to the tubing with an adhesive.

16. The process according to claim 15, wherein patch is adhered to an outside surface of the tubing.

* * * * *